(12) United States Patent
Mei

(10) Patent No.: US 11,143,831 B2
(45) Date of Patent: Oct. 12, 2021

(54) LIGHT-EMITTING ROW-TYPE CONNECTION LINE ASSEMBLY

(71) Applicant: DONGGUAN QINGHAI ELECTRONICS TECHNOLOGY CO., LTD, Guangdong (CN)

(72) Inventor: Donghai Mei, Guangdong (CN)

(73) Assignee: DONGGUAN QINGHAI ELECTRONICS TECHNOLOGY CO., LTD, Dongguan (CN)

( * ) Notice: Subject to any disclaimer, the term of this patent is extended or adjusted under 35 U.S.C. 154(b) by 0 days.

(21) Appl. No.: 17/232,146

(22) Filed: Apr. 16, 2021

(65) Prior Publication Data

US 2021/0231300 A1    Jul. 29, 2021

Related U.S. Application Data

(63) Continuation of application No. PCT/CN2019/087781, filed on May 21, 2019.

(30) Foreign Application Priority Data

Jan. 12, 2019   (CN) .......................... 201920049287.5

(51) Int. Cl.
    *G02B 6/42*    (2006.01)
    *G02B 6/43*    (2006.01)
    (Continued)

(52) U.S. Cl.
    CPC ............ *G02B 6/428* (2013.01); *G02B 6/0008* (2013.01); *G02B 6/241* (2013.01); *G02B 6/42* (2013.01);
    (Continued)

(58) Field of Classification Search
    CPC .... G02B 6/3807; G02B 6/381; G02B 6/3817; G02B 6/3831; G02B 6/3869;
    (Continued)

(56) References Cited

U.S. PATENT DOCUMENTS

2003/0072537 A1* 4/2003 Eichenberger ....... G02B 6/3807
                                                        385/89
2017/0033514 A1    2/2017 Wang
                   (Continued)

FOREIGN PATENT DOCUMENTS

CN        202178480 U       3/2012
CN        202444142 U       9/2012
                   (Continued)

*Primary Examiner* — Michael P Mooney

(57) ABSTRACT

A light-emitting row-type connection line assembly, which includes two connectors, a plurality of light-emitting lines, a plurality of connection lines and a plurality of light sources to make the plurality of light-emitting lines emit light. Each of the two connectors is provided with a plurality of ports for connecting the plurality of connection lines, and the plurality of ports are arranged spaced apart and in multiple rows. Each of the two connectors is provided with a light-emitting portion. The light-emitting portion is provided with a plurality of slots for connecting the plurality of light-emitting lines. The number of the plurality of slots is the same with that of ports in each row. A spacing between adjacent two slots is the same with that between adjacent two ports. The plurality of light-emitting lines are covered by a coating layer to form a light-emitting line row.

5 Claims, 1 Drawing Sheet

(51) Int. Cl.
    *G02B 6/44*     (2006.01)
    *G02B 6/24*     (2006.01)
    *F21V 8/00*     (2006.01)
    *F21V 23/06*     (2006.01)
    *F21S 4/28*     (2016.01)
    *F21V 23/00*     (2015.01)

(52) U.S. Cl.
    CPC ......... *G02B 6/4228* (2013.01); *G02B 6/4249* (2013.01); *G02B 6/43* (2013.01); *G02B 6/4403* (2013.01); *G02B 6/4471* (2013.01); *F21S 4/28* (2016.01); *F21V 23/002* (2013.01); *F21V 23/005* (2013.01); *F21V 23/06* (2013.01)

(58) Field of Classification Search
    CPC .. G02B 6/3885; G02B 6/3895; G02B 6/3897; G02B 6/42; G02B 6/4228; G02B 6/4246; G02B 6/4249; G02B 6/428; G02B 6/4292; G02B 6/43; G02B 6/4401; G02B 6/4416; G02B 6/4439; G02B 6/4452; G02B 6/4471; G02B 6/4472; G02B 6/0008; G02B 6/122; G02B 6/241; G02B 6/262; G02B 6/4403

USPC ..................................................... 385/88–92
    See application file for complete search history.

(56)         References Cited

U.S. PATENT DOCUMENTS

2018/0356054 A1\*   12/2018   Chin ................... G02B 6/0008
2020/0192040 A1\*   6/2020   Li ....................... G02B 6/4403

FOREIGN PATENT DOCUMENTS

| | | |
|---|---|---|
| CN | 202513392 U | 10/2012 |
| CN | 202678672 U | 1/2013 |
| CN | 103269003 B | 8/2015 |
| CN | 204858215 U | 12/2015 |
| CN | 205724242 U | 11/2016 |
| CN | 206163870 U | 5/2017 |
| CN | 207753268 U | 8/2018 |

\* cited by examiner

LIGHT-EMITTING ROW-TYPE CONNECTION LINE ASSEMBLY

CROSS-REFERENCE TO RELATED APPLICATIONS

This application is a continuation of International Patent Application No. PCT/CN2019/087781, filed on May 21, 2019, which claims the benefit of priority from Chinese Patent Application No. 201920049287.5, filed on Jan. 12, 2019. The content of the aforementioned applications, including any intervening amendments thereto, is incorporated herein by reference in its entirety.

TECHNICAL FIELD

This application relates to light-emitting lines, and more particularly to a light-emitting row-type connection line assembly.

BACKGROUND

The connection between the commercial available light-emitting lines and the light source is usually realized using a single optical fiber or connection line. With regard to the light emission of a wire with multiple pins, the line connection process is complicated and time- and labor-consuming. In addition, the lines are prone to cross and disorder. These problems are solved often by repeatedly setting multiple light-emitting lines and fixing and sorting the light-emitting lines with a line comb. However, this process not only increases the cost, but also renders the operation complicated, reducing the production efficiency. Moreover, the use of the line comb affects the appearance of the light-emitting line.

SUMMARY

The present disclosure provides a light-emitting row-type connection line assembly to solve the technical problems.

Provided herein is a light-emitting row-type connection line assembly, comprising:

two connectors;
a plurality of light-emitting lines;
a plurality of connection lines; and
a plurality of light sources configured to make the plurality of light-emitting lines emit light;

wherein each of the two connectors is provided with a plurality of ports for connecting the plurality of connection lines; the plurality of ports are arranged spaced apart and in multiple rows; each of the two connectors is provided with a light-emitting portion; the light-emitting portion is provided with a plurality of slots for connecting the plurality of light-emitting lines; the number of the plurality of slots is the same with that of ports in each row; a spacing between adjacent two slots is the same with that between adjacent two ports; and the plurality of light-emitting lines are covered by a coating layer to form a light-emitting line row.

In some embodiments, the number of the ports in each row is the same with the number of the plurality of light-emitting lines; the ports in each row are in one-to-one correspondence to the plurality of light-emitting lines; and two ends of each of the plurality of connection lines are connected to ports of the same row on the two connectors, respectively.

In some embodiments, two ends of each of the plurality of light-emitting lines are connected to two slots corresponding to each other on the two connectors, respectively.

In some embodiments, the light-emitting portion is provided with a printed circuit board (PCB) at a position close to the plurality of slots; and the plurality of light sources are arranged on the PCB at positions respectively corresponding to the plurality of slots.

In some embodiments, the coating layer is made of a transparent polyvinyl chloride (PVC) material.

The beneficial effects of the present disclosure are described as follows.

In the disclosure, a plurality of light-emitting lines are wrapped into a row through a coating layer, which solves the problems in the prior art that the light-emitting connection lines are prone to cross and disorder, without using a conventional line comb, reducing the production cost and bringing greater profits to the enterprise.

DETAILED DESCRIPTION OF EMBODIMENTS

Figure 1:
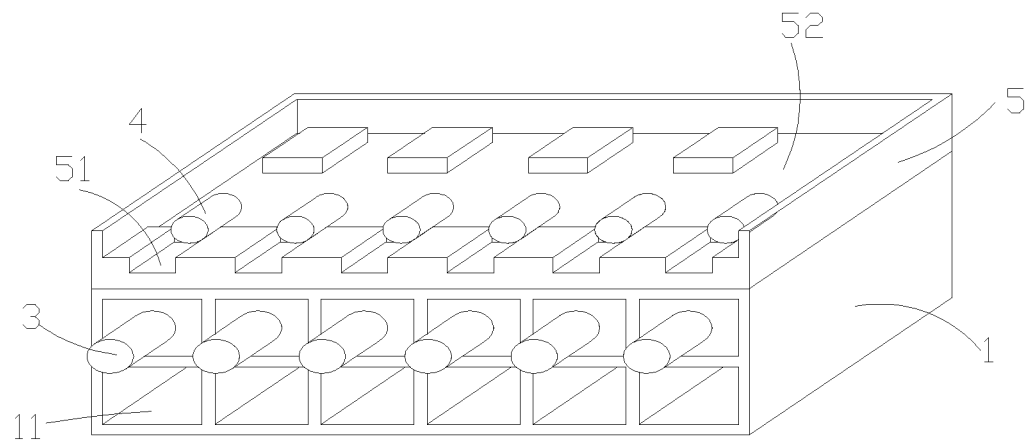
FIG. 1 schematically depicts a structure of a light-emitting row-type connection line assembly in accordance with an embodiment of the present disclosure.

The embodiments of the present disclosure are described in detail below. The embodiments are exemplarily shown in the accompanying drawings, in which the same or similar reference numerals indicate the same or similar elements or elements with the same or similar functions. The embodiments presented in the accompany drawings are illustrative of this disclosure, and should not be understood as a limitation to the present disclosure.

As used herein, it should be understood that the terms "center", "longitudinal", "transverse", "length", "width", "thickness", "upper", "lower", "front", "back", "left", "right", "vertical", "horizontal", "top", "bottom", "inner", "outer", "clockwise", "counterclockwise" and other directions or positional relationships are based on the orientation or positional relationship shown in the accompany drawings, and are only for the convenience of describing the disclosure and simplifying the description, rather than indicating or implying that the device or element referred to must have a specific orientation, be constructed and operated in a specific orientation. Therefore, these terms cannot be understood as a limitation of the present disclosure.

In addition, the terms "first" and "second" are only descriptive, and cannot be understood as indicating or implying relative importance or implicitly indicating the number of indicated technical features. Thus, the terms "first" and "second" may explicitly or implicitly indicate that there is one or more features defined thereby. Unless otherwise specified, the term "a plurality of" means two or more.

Unless otherwise specified, the terms "install", "connect", "join" and "fix" should be understood in a broad sense. For example, it can be interpreted as fixed connection, detachable connection or integral connection, or can be interpreted as mechanical connection or electrical connection, or can be interpreted as direct connection or indirect connection through a medium, or can be interpreted as communication between two elements. For those skilled in the art, the specific meanings of the above terms can be understood according to the corresponding description.

Unless otherwise clearly specified, the description "the first feature is "on" or "under" the second feature" may mean that the first and second features are in direct contact or the first and second features are in contact through another feature therebetween. Moreover, the description "the first feature is "above" the second feature" means that the first feature is directly above or obliquely above the second feature, or simply means that the level of the first feature is higher than that of the second feature. Similarly, the description "the first feature is "below" the second feature" means that the first feature is directly below or obliquely below the second feature, or simply means that the level of the first feature is lower than the second feature.

The present disclosure will be further described with reference to the embodiments and the accompanying drawings.

Figure 2:
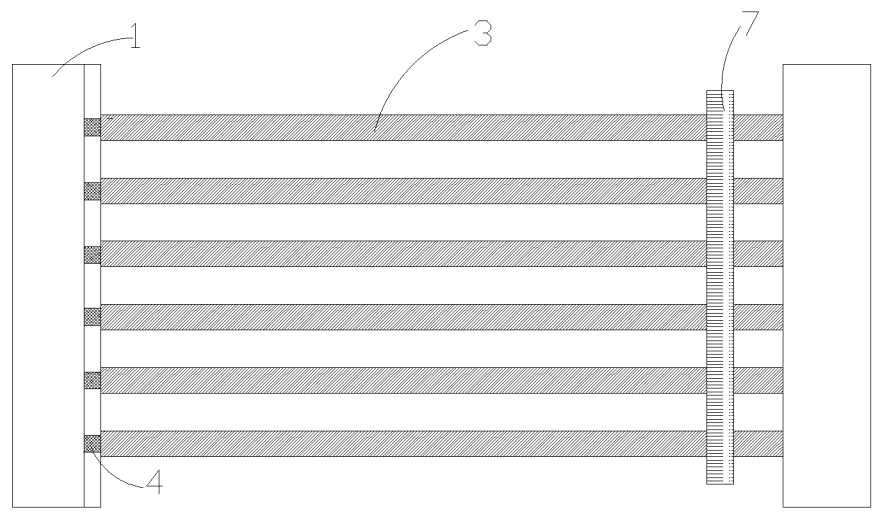
FIG. 2 is a sectional view of a connection line in accordance with an embodiment of the present disclosure.
Figure 3:
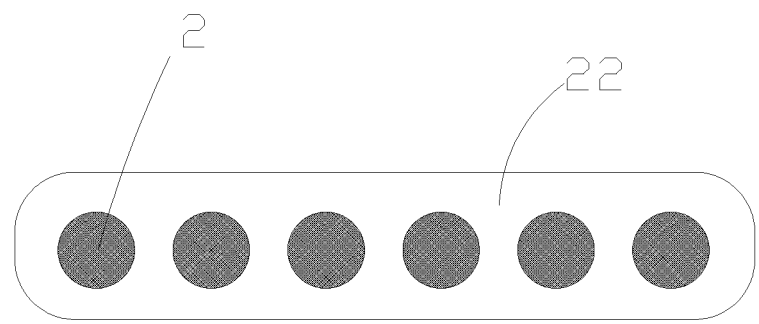
FIG. 3 is a sectional view of a row of light-emitting lines in accordance with an embodiment of the present disclosure.

As shown in FIGS. 1-3, the present disclosure provides a light-emitting row-type connection line assembly, which includes two connectors 1, a plurality of light-emitting lines 2, a plurality of connection lines 3 and a plurality of light sources 4 to make the plurality of light-emitting lines 2 emit light. Each of the two connectors 1 is provided with a plurality of ports 11 for connecting the plurality of connection lines 3, and the plurality of ports 11 are arranged spaced apart and in multiple rows. Each of the two connectors 1 is provided with a light-emitting portion 5. The light-emitting portion 5 is provided with a plurality of slots 51 for connecting the plurality of light-emitting lines 2, and the number of the plurality of slots 51 is the same with that of ports 11 in each row. A spacing between adjacent two slots 51 is the same with that between adjacent two ports 11. The plurality of light-emitting lines 2 are covered by a coating layer 22 to form a light-emitting line row. When the plurality of light-emitting lines 2 are covered by the coating layer 22, portions configured to connect to the plurality of slots 51 at both ends of the plurality of light-emitting lines 2 are reserved, such that the plurality of light-emitting lines 2 can be well connected to the plurality of slots 51.

In this embodiment, each of the two connectors 1 is provided with the plurality of ports 11 for connecting the plurality of connection lines 3, and the plurality of ports 11 are arranged spaced apart and in multiple rows. Each of the two connectors 1 is provided with the light-emitting portion 5. The light-emitting portion 5 is provided with the plurality of slots 51. The number of the plurality of slots 51 is the same with that of ports 11 in each row. The spacing between adjacent two slots 51 is the same with that between adjacent two ports 11. In this way, the plurality of light-emitting lines 2 and the plurality of connection lines 3 are arranged at regular intervals. The plurality of light-emitting lines 2 are wrapped into a row through the coating layer 22, such that the plurality of light-emitting lines 2 are arranged at regular intervals to form a row, which solves the problems that the traditional light-emitting connection lines are prone to cross and disorder, without using a conventional line comb, reducing production costs and bringing greater profits to the enterprise.

In an embodiment, the number of the ports 11 in each row is the same with the number of the plurality of light-emitting lines 2, and the ports 11 in each row are one-to-one correspond to the light-emitting lines 2. Two ends of each of the plurality of the connection lines 3 are connected to ports 11 of the same row on the two connectors 1, respectively, such that the plurality of connection lines 3 can be connected to other devices through the two connectors 1.

In an embodiment, two ends of each of the plurality of light-emitting lines 2 are connected to two slots 51 corresponding to each other on the two connectors 1, respectively. The light-emitting row-type connection line assembly provided herein can emit light under a light radiation of the light source 4.

In an embodiment, the light-emitting portion 5 is provided with a printed circuit board (PCB) 52 at a position close to the plurality of slots 51. The plurality of light sources 4 are arranged on the PCB 52 at positions corresponding to the plurality of slots 51. The plurality of light sources 4 are in correspondence to the plurality of slots 51, such that a light emitted by the plurality of light sources 4 can illuminate the plurality of light-emitting lines 2, and the plurality of light-emitting lines 2 reflect the light of the plurality of light sources 4, so as to emit light.

In an embodiment, the coating layer 22 is made of a transparent polyvinyl chloride (PVC) material. Therefore, the plurality of light-emitting lines 2 can reflect the light of the plurality of light sources 4 under the illumination of the plurality of light sources 4, preventing the light reflected by the plurality of light-emitting lines 2 from being blocked by the coating layer 22 and affecting the light-emitting effect of the light-emitting row-type connection line assembly.

In an embodiment, the plurality of light sources 4 are light-emitting diode (LED) lamps, which are energy-saving and environmental-friendly.

In an embodiment, the plurality of light sources 4 are red-green-blue (RGB) lights, and the PCB 52 is provided with a device for controlling a color change of the RGB lights. A wire of the device can be connected in parallel to a 5V or 12V connection line 3, and matches with a remote control or a sound control device, such that the light-emitting connection line assembly can be controlled to emit light of different colors.

In an embodiment, the plurality of connection lines 3 can be connected and combed by a box-shaped line comb 7 to prevent the plurality of connection lines 3 from crossing together.

The light-emitting row-type connection line further includes a cover plate used with the light-emitting portion 5, and the cover plate seals the plurality of light sources 4 to protect the plurality of light sources 4 and the PCB 52.

In the description of this disclosure, the terms "one embodiment", "some embodiments", "an embodiment", "examples", "specific examples" or "some examples" means that the specific feature, structure, material or feature described with the references to the embodiment or example is included in at least one embodiment or example of the present disclosure. In this description, the schematic representations of the above terms do not necessarily refer to the same embodiment or example. Moreover, the described specific features, structures, materials or characteristics can be combined in any one or more embodiments or examples in a suitable manner.

The embodiments described above are illustrative of the disclosure, and should not be considered as a limitation of the present disclosure. Any modifications and replacements made by those skilled in the art without departing from the spirit of the present disclosure should fall within the scope of the disclosure.

What is claimed is:

1. A light-emitting row-type connection line assembly, comprising:
   two connectors;
   a plurality of light-emitting lines;
   a plurality of connection lines; and
   a plurality of light sources configured to make the plurality of light-emitting lines emit light;
   wherein each of the two connectors is provided with a plurality of ports for connecting the plurality of connection lines; the plurality of ports are arranged spaced apart and in multiple rows; each of the two connectors is provided with a light-emitting portion; the light-emitting portion is provided with a plurality of slots for connecting the plurality of light-emitting lines; the number of the plurality of slots is the same with that of ports in each row; a spacing between adjacent two slots is the same with that between adjacent two ports; and the plurality of light-emitting lines are covered by a coating layer to form a light-emitting line row.

2. The light-emitting row-type connection line of claim 1, wherein the number of the ports in each row is the same with the number of the plurality of light-emitting lines; the ports in each row are in one-to-one correspondence to the plurality of light-emitting lines; and two ends of each of the plurality of connection lines are connected to ports of the same row on the two connectors, respectively.

3. The light-emitting row-type connection line of claim 1, wherein two ends of each of the plurality of light-emitting lines are connected to two slots corresponding to each other on the two connectors, respectively.

4. The light-emitting row-type connection line of claim 3, wherein the light-emitting portion is provided with a printed circuit board (PCB) at a position close to the plurality of slots; and the plurality of light sources are arranged on the PCB at positions respectively corresponding to the plurality of slots.

5. The light-emitting row-type connection line of claim 1, wherein the coating layer is made of a transparent polyvinyl chloride (PVC) material.

* * * * *